Patented May 7, 1935

2,000,034

UNITED STATES PATENT OFFICE 2,000,034

PROCESS FOR THE MANUFACTURE OF CERTAIN PARA-N-SEC-ALKYLAMINO-PHENOLS AND OTHER SUBSTITUTED PHENOLS AND THEIR SALTS

Randolph T. Major, Westfield, N. J., assignor to Merck & Co. Inc., Rahway, N. J., a corporation of New Jersey No Drawing. Application July 30, 1931, Serial No. 554,075

8 Claims. (Cl. 260—128)

This invention relates to improved processes for the manufacture of certain para-N-sec-alkylamino-phenols and other substituted phenols and their salts used largely as photographic developers and fur dyes.

Para-N-isopropylamino-phenol has been prepared by Buc, U. S. Patent 1,555,452, September 29, 1925, by the interaction of isopropyl chloride and p-aminophenol.

The preparation of N-methyl aromatic amines, including para-N-methyl-amino-phenol, by the catalytic reduction of N-aryl-formaldimine, $CH_2=N-Ar$, is described by E. Merck in German Patent 437,975, September 13, 1924.

Skita and Keil, Berichte, 61B, 1686 (1928) have described the preparation of N-cyclohexyl-aniline by the catalytic reduction at room temperature of a mixture of aniline and cyclohexanone in the presence of a platinum catalyst.

Riedel, A. G., German Patent 423,132, March 4, 1924, has described the preparation of aralkyl-arylamines by the catalytic reduction of N-aryl-aldimines.

Skita and Keil, Berichte, 61B, 1458, 1682 (1928), have described the preparation of alkyl-sec-alkylamines by the catalytic reduction of mixtures of ketones and alkylamines in various solvents in the presence of a platinum catalyst.

Major, J. Am. Chem. Soc., 53, 1901 (1931), has shown that para-N-sec-alkylamino-phenols may be prepared by the catalytic reduction at room temperature of a mixture of p-nitro- or nitroso-phenol and a ketone in the presence of a platinum catalyst. On the other hand, it has been shown that there is no appreciable reaction at room temperature between p-aminophenol, acetone, and hydrogen in the presence of a platinum catalyst.

I have also found that the preparation of para-N-sec-alkylamino-phenols may also conveniently and relatively cheaply be obtained in very pure form by the reduction of p-(isoalkylidene-amino)-phenols, $R(R')C=NC_6H_4OH$, in an inert solvent by hydrogen at room temperature in the presence of a metallic catalyst, preferably platinum or palladium, which appear to be most serviceable for the purpose when working at such temperatures. I have also found that para-N-sec-alkylamino-phenols may, also, conveniently be prepared by reducing a solution of p-amino-phenol in an aliphatic ketone by hydrogen in the presence of a metallic catalyst such as platinum or palladium at or near the boiling point of the ketone. Presumably, the ketone first condenses with the p-aminophenol to form p-(isoalkylidene-amino)-phenol which in turn is reduced to the para-N-sec-alkylamino-phenol.

In the process thus carried out with para-aminophenol some of the latter remains at the end of the reaction, and appears as an impurity which can, however, be readily removed from the N-alkylamino-phenol by combining the amino-phenol with aldehydes according to known methods. A convenient method for accomplishing the separation of the aminophenol is as follows:

An aqueous solution of the mixture of the p-alkylamino-phenol and the p-aminophenol in a weak acid is shaken with an aromatic aldehyde. The condensation product between the aldehyde and the p-aminophenol is removed. Excess of the aldehyde is removed by heat or an inert solvent. The remaining solution contains the salt of the purified p-alkylamino-phenol. The free base may be obtained by means of alkalies.

These isoalkylamino-phenols after purification may readily be converted into soluble salts, for example the sulphate or hydrochloride. The salts of p-isoalkylamino-phenols are white, crystalline compounds, readily soluble in water and are highly desirable for use as photographic developers and for hair dyes.

The following examples will illustrate preferred methods of applying my invention:

*Example I.*—2.5 grams of p-(isopropylidene-amino)-phenol is dissolved in alcohol at room temperature. To this solution is then added 0.1 gram of a platinum oxide catalyst prepared preferably according to the method of Adams and Shriner, J. Am. Chem. Soc., 45, 2171 (1923). The mixture is shaken in an atmosphere of hydrogen at room temperature until the calculated amount of hydrogen has been absorbed. After the catalyst has been filtered off, the residue of alcohol is distilled off in vacuo. The remaining solid is recrystallized from benzene. It is obtained in the form of white, needle-like crystals, soluble in dilute acids and alkalies, and in ether and in alcohol, and insoluble in water, and has a melting point of 155–156° C.

In the place of alcohol, obviously any suitable inert solvent, such as, for instance, dioxane or acetone, may be used as a solvent for the p-(isopropylidene-amino)-phenol.

*Example II.*—13.9 grams of p-aminophenol is dissolved in an excess of acetone at room temperature. To this solution is then added 0.1 gram of a platinum oxide catalyst, prepared preferably according to the method above described. The mixture is first heated to the boiling point and then shaken in an atmosphere of hydrogen until the calculated amount of hydrogen has been absorbed. After the catalyst has been filtered off, the residue of acetone is distilled off in vacuo. The remaining material is then dissolved in dilute acetic acid. More than sufficient benzaldehyde is then added to combine with all the p-amino-phenol which remains. The mixture is vigorously shaken for half an hour. It is then extracted with ether. The aqueous layer is made neutral with sodium carbonate. The p-isopropyl-aminophenol which precipitates out is filtered off, and recrystallized from benzene. It is obtained in the form of white, needle-like crystals, soluble in dilute acids and alkalies, and in ether and in alcohol, and insoluble in water, and has a melting point of 155–156° C.

These exemplifications are given by way of illustration, but it is obvious that some qualitative and quantitative changes may be made in the details of processes, without departing from the spirit and scope of my invention.

Thus, in Example I, as already explained, any appropriate inert solvent will serve in place of the alcohol as exemplified; also any suitable catalyst such as palladium may replace the platinum as described. As explained later, a nickel catalyst will also serve, if working at higher temperature, for instance, and other similar adaptations will readily suggest themselves for the production of the specific compounds to which the process may be directed. In Example II the method of removing the remaining para amino-phenol is illustrated with the use of benzaldehyde, but it will also be obvious that other suitable aromatic aldehydes will serve as equivalents for this purpose, and throughout any suitable recrystalizing medium may be used as an equivalent for benzene.

In the foregoing examples my method has been shown with the use of p-(isopropylidene-amino)-penol and p-amino-phenol, respectively, but I find that the process as applied may be employed generally also for the preparation of homologous secondary alkylamino-phenols, by treating the corresponding p-(sec-alkylidene-amino)-phenol by the method of Example I, or dissolving the p-amino phenol in the appropriate ketone, analogously as in Example II. I have also found that I am not limited to these precise forms of materials but may use quite satisfactorily in their places suitable carbon substituted derivatives. It is also possible to carry out and expedite these reactions somewhat by working at higher temperatures and under increased atmospheric pressures with appropriately modified conditions. At higher temperatures, for instance, a nickel catalyst will be found economically more advantageous in the place of the relatively more costly platinum or palladium. However, the temperature range must not be expanded too far because of the tendency to the formation of dialkyl compounds. I have found, on the whole, that working at room temperatures and at normal pressure, and with the catalysts, as set forth in the examples, yields the most satisfactory average practical results as to purity and yields.

Having thus set forth the manner and means of carrying out this invention, I request the issuance of Letters Patent on the following claims:

1. In a process of making para-N-sec-alkyl-amino-phenols, the step of reducing p-(isoalkylidene amino)-phenols, in alcoholic solution, by hydrogen with the aid of a platinum catalyst.

2. In a process of making para-N-sec-alkyl-amino-phenols, the step of reducing p-(isoalkylidene amino)-phenols, in solution in an inert solvent, by hydrogen with the aid of a metal hydrogenation catalyst.

3. The process of making para-N-sec-alkyl-amino-phenols comprising the solution of p-(isoalkylideneamino)-phenol in an inert solvent, adding a metal hydrogenation catalyst, shaking the mixture in an atmosphere of hydrogen until the required amount of hydrogen has been taken up, filtering off the catalyst and distilling off the residue of the solvent in vacuo, and recrystallizing the formed para-N-sec-alkylamino-phenol.

4. The process of making p-iso-propylamino-phenol comprising the solution of p-(isopropylidene-amino)-phenol in alcohol, adding platinum oxide as a catalyst, shaking the mixture in an atmosphere of hydrogen until the required amount of hydrogen has been taken up, filtering off the catalyst and distilling off the residue of alcohol in vacuo, and recrystallizing the formed para-iso-proplyamino-phenol from benzene.

5. In the process of making p-isopropyl-amino phenol, from p-amino phenol, the step of intermediately forming p-(isopropylideneamino)-phenol by condensation of the p-amino phenol with acetone.

6. In the process of making para-N-sec-alkyl-aminophenols with the chemical formula p-RR′CHNHC$_6$H$_4$OH, in which R and R′ are alkyl radicals, the step of reducing the reaction product of p-aminophenol and an aliphatic ketone with the formula RR′CO in which R and R′ have the connotation as above, by hydrogen with the aid of a metal hydrogenation catalyst.

7. In a process of making para-N-sec-alkyl-aminophenols, with the formula of p-RR′-CHNHC$_6$H$_4$OH, in which R and R′ are alkyl radicals, the step of reducing the reaction product of p-aminophenol and an aliphatic ketone with the formula RR′C=O, by hydrogen and with the aid of platinum as a catalyst.

8. In a process of making para-N-sec-alkyl-amino-phenols with the formula p-RR′CHNHC$_6$H$_4$OH, in which R and R′ are alkyl radicals, from p-amino-phenol, the step of intermediately forming a p-(isoalkylidene-amino)-phenol with the formula, RR′C=NC$_6$H$_4$OH, by condensation of the p-aminophenol with an aliphatic ketone with the formula RR′CO.

RANDOLPH T. MAJOR.